United States Patent [19]
Gharda

[11] Patent Number: 6,009,520
[45] Date of Patent: Dec. 28, 1999

[54] METHOD AND APPARATUS STANDARDIZING USE OF NON-VOLATILE MEMORY WITHIN A BIOS-ROM

[75] Inventor: Laurent Kirk Gharda, Menlo Park, Calif.

[73] Assignee: Phoenix Technologies, Ltd, San Jose, Calif.

[21] Appl. No.: 08/988,603

[22] Filed: Dec. 10, 1997

[51] Int. Cl.[6] .................................................. G06F 9/445
[52] U.S. Cl. .............................................. 713/1; 713/100
[58] Field of Search ...................... 395/651, 600, 395/681, 622, 281, 442, 500, 182.06; 707/101; 713/1, 2, 100; 710/104; 709/300

[56] References Cited

U.S. PATENT DOCUMENTS

| | | | |
|---|---|---|---|
| 5,072,368 | 12/1991 | Foreman et al. | 395/575 |
| 5,321,827 | 6/1994 | Lu et al. | 395/500 |
| 5,418,918 | 5/1995 | Vander Kamp et al. | 395/375 |
| 5,504,904 | 4/1996 | Dayan et al. | 395/700 |
| 5,544,356 | 8/1996 | Robinson et al. | 395/600 |
| 5,579,489 | 11/1996 | Dornier et al. | 395/281 |
| 5,592,669 | 1/1997 | Robinson et al. | 395/622 |
| 5,630,093 | 5/1997 | Holzhammer et al. | 395/442 |
| 5,671,413 | 9/1997 | Shipman et al. | 713/2 |
| 5,734,816 | 3/1998 | Niijima et al. | 395/182.06 |
| 5,832,263 | 11/1998 | Hansen et al. | 395/681 |
| 5,832,493 | 11/1998 | Marsall et al. | 707/101 |
| 5,835,760 | 11/1998 | Harmer | 713/2 |
| 5,854,905 | 12/1998 | Garney | 710/104 |
| 5,896,534 | 4/1999 | Pearce et al. | 709/300 |

*Primary Examiner*—Joseph E. Palys
*Assistant Examiner*—Rijue Mai
*Attorney, Agent, or Firm*—Donald R. Boys

[57] ABSTRACT

A Basic Input-Output System (BIOS) includes a management and driver module adapted to accomplish editing functions for the BIOS. Plug-in modules are added to the BIOS by submitting the plug-ins to the driver module, which determines compatibility and available space for adding, and acts accordingly, adding a candidate module to the BIOS if space is available and the plug-in module is determined to be compatible with the BIOS and the driver module. Plug-ins can also be removed by action of the driver module, which also performs management functions in identifying and initializing resident plug-in modules.

21 Claims, 7 Drawing Sheets

| Field | Offset | Length | Value |
|---|---|---|---|
| Signature | 00h | 8-bytes | VROMBIOS |
| Version | 08h | 1-byte | 10h |
| Length | 09h | 1 Word | 2Ah |
| Checksum | 0Bh | 1 byte | |
| Real Mode offset to entry point | 0Ch | 1-word | |
| Real Mode segment to entry point | 0Eh | 1-word | F000h |
| 32-bit protected mode code segment base address | 10h | 1-Dword | |
| Protected mode offset to entry point | 14h | 1-Dword | |
| 16-bit protected mode code segment base address | 18h | 1-Dword | |
| 32-bit code segment length | 1Ch | 1-Dword | 128K |
| 16-bit code segment length | 20h | 1-Dword | 64K |
| 32-bit VROM segment base address | 22h | 1-Dword | |
| 32-bit VROM data segment length | 26h | 1-Dword | 128K |

Installation Check Table

*Fig. 4*

| | |
|---|---|
| Signature | Represented as ASCII string "VROMBIOS" |
| Version | A BCD value i.e. (value of 10h = version 1.0. |
| Length | Total bytes of the entire installation structure starting from the signature field |
| Checksum | Adds up the bytes in the installation structure and verifies a valid structure |
| Real Mode Interface | Segment offset of the entry point |
| 32-bit Protected Mode Interface | Code segment base address |

Field Definition Table for Fig. 4

*Fig. 5*

| |
|---|
| Function-0 Get VROM Lists<br><br>Description: Returns VROM lists residing in flash VROM into List Buffer. |
| Function-1 Get VROM Size<br><br>Description: Returns VROM Size in bytes available to third party calling software |
| Function-2 Enable/Disable VROM List<br><br>Discription: Allows third party calling software to enable or disable The VROM list in the VROM Lists |
| Function-3 Read in VROM Data<br><br>Description: Read in the VROM Data of the specified VROM list from the VROM area |
| Function-4 Add/Delete VROM Data<br><br>Description: Allows third party calling software to add or delete VROM data |

Table of third party software functions

*Fig. 6*

| Field | Offset | Length |
|---|---|---|
| Handle | 00h | 1 byte |
| Link to next list | 01h | 1 byte |
| VROM List State | 02h | 1 word |
| VROM Type | 04h | 1 word |
| Offset to VROM data | 06h | 1 dword |
| VROM data size | 08h | 1 dword |

Table of VROM List Stucture

| |
|---|
| Handle: VROM List Identifier |
| Link to next list: A pointer to a next VROM List |
| VROM list state: Represents the status of a VROM List |
| VROM type: Type of represented VROM data |
| Offset to VROM data: Phisical location offset |
| VROM data size: Indicates length of VROM data |

Definitions of fields in above table

*Fig. 7*

METHOD AND APPARATUS STANDARDIZING USE OF NON-VOLATILE MEMORY WITHIN A BIOS-ROM

FIELD OF THE INVENTION

The present invention is in the field of Basic Input Output System (BIOS) systems and has particular application to methods and apparatus including software for utilizing unused flash or other non-volatile memory within a computer BIOS system chip.

BACKGROUND OF THE INVENTION

The present invention relates to system Basic Input Output Systems (BIOS). It is well-known in the computer arts that a BIOS program is provided, particularly for personal computers, to manage the intricate and critical operations of testing and initializing system hardware and, in general, preparing the computer and its connected peripherals for operation. Part of this procedure is widely known as a Power-On Self Test (POST) sequence. Beyond the POST procedure, the BIOS directs Boot operations, typically from a designated Boot device, such as a connected hard disk drive, and after Boot BIOS routines are accessed as needed to support operations such as communication between the connected digital devices that make up the computer system.

In early stages of PC development a relatively small, non-volatile, read-only memory (ROM) chip was more than adequate for system BIOS, and the relatively slow access to ROM was also adequate. As PC technology has developed to much faster CPUs and a wide range of ever more powerful and sophisticated peripheral devices, BIOS development has been forced to keep pace. BIOS routines have become much larger than early systems, and high operating speed has become necessary.

As a result of system development it is now common in state-of-the-art systems for BIOS to be compressed in a ROM chip, and for BIOS routines to be shadowed to system random-access memory (RAM) where the routines may be accessed and executed and much higher speeds than is possible running directly from ROM.

At the same time that BIOS routines have been enhanced and further developed for more sophisticated and powerful PCs, there has been parallel development in ROM chips. One such development is known as Flash ROM. Flash ROM is non-volatile IC memory that may be erased, either as a whole or in specific blocks, and overwritten with new memory values. BIOS is now provided in high-end PCs in these Flash ROM chips, providing new advantages, such as an ability to address system bugs in the field. BIOS can hence be "re-flashed" in the field to provide a new version, for example, such as by downloading a new version from the Internet, and re-flashing the existing BIOS ROM with the new version.

In a related development, flash ROM chips have been made larger and faster, and for various reasons related to economy of scale it has become uneconomic to make small flash ROM chips. At the time of the present patent application flash ROM chips are readily available in sizes of, for example, 1 mega-bit, (1 Mb), and 2 and 4 Mb and larger. These sizes relate to the more common byte-related memory capacity designation by a factor of eight. A four Mb Flash ROM the has a code capacity of 512 kilo-byte (KB).

As a consequence of the availability of relatively inexpensive, large flash ROM chips, and the fact that compressed code is now common in BIOS, it is quite common at the time of the present application for system BIOS in Flash ROM to occupy considerably less than the total memory capacity of the chip. At the same time, because rapid development of new peripherals and expanded functionality of others, such as video displays, which are now high resolution and in color, there is a need for initialization of many devices at system start up, and initialization of all the devices cannot be included in the system BIOS all of the devices. Many such devices (VGA adapters, for example) therefore have BIOS functions provided by the manufacturers of the devices.

With the use of larger ROM chips, and particularly with Flash ROM, it is now possible for original-equipment manufacturers (OEMs), Value-Added Resellers (VARs) and the like to use extra memory capacity in a ROM chip storing BIOS functions for providing BIOS functions for peripherals, and also other routines, such as, for example, pre-boot security routines. With the present state of the art, however, it is necessary that a third party cooperate closely with a BIOS provider to add to and enhance the functionality of a BIOS chip. The partitioning, addressing, size, and other characteristics of the chip have to be known by the third party, and the structure and storage estate of the resident code has to be known as well.

What is clearly needed, and what is provided by the present invention is a BIOS system that allows third parties to add to and to customize a BIOS ROM (BIOS extensions) without having to deal with all of the detailed characteristics of the chip and code stored on the chip. In such a system, OEMs, for example, may quickly, easily, and inexpensively provide initialization functions for different mixes of peripheral devices, and to also add BIOS plug-ins for other functions that may provide added value if performed during pre-boot operations and the like.

SUMMARY OF THE INVENTION

In a preferred embodiment of the present invention a Basic Input Output System (BIOS) program is provided, comprising BIOS function code modules; and a managing driver code module. The managing driver code module is adapted to scan a candidate code module presented for addition to the BIOS program, to validate the candidate module as compatible and authorized to be added, to scan the BIOS program for space available to add the candidate module, and to add the candidate module if validated and space is available. In preferred embodiments the BIOS program includes a Power On Self Test (POST) routine, and the managing driver code module is further adapted to cooperate with the POST routine as the POST routine is executed to identify and initiate code modules for execution.

In another aspect of the invention a Basic Input Output System (BIOS) is provided, comprising a non-volatile storage device; a BIOS program residing on the non-volatile storage device and occupying a first number of bytes in a first storage region; and a managing driver code module residing on the non-volatile storage device and occupying a second number of bytes in a second storage region, wherein the first number of bytes and the second number of bytes together are less than the maximum capacity by a third number of bytes defining a third storage region for storing plug-in modules. The managing driver code module has access to specifics of all resident code and characteristics of the storage device, and is adapted, upon execution, to add plug-in modules and to remove plug-in modules from the storage device in the third storage region. In this embodiment addition of a plug-in module is managed by transferring a physical copy of the BIOS program, the managing driver code module, and any existing plug-in modules in the storage region to random-access memory (RAM), scanning any candidate plug-in module for validity and compatibility, confirming space available for adding the candidate, adding the candidate to the physical map in the third storage region if space is available and the candidate is valid, creating thereby a new physical map, erasing the non-volatile storage device, and copying the new physical map to the non-volatile storage device. The non-volatile storage device may be a flash ROM, and erasing involves flash-erasing the ROM. Use of flashROM of at least two mega-bits (Mb) is preferred. Addition of a plug-in module is managed by transferring a physical copy of at least the third storage region to random-access memory (RAM), scanning any candidate plug-in module for validity and compatibility, confirming space available in the third storage region for adding the candidate, adding the candidate to the physical map in the third storage region if space is available and the candidate is valid, creating thereby a new physical map, erasing the portion of the non-volatile storage device transferred to RAM, and copying the new physical map to the non-volatile storage device.

In some embodiments the BIOS program includes a Power On Self Test (POST) routine, and the managing driver code module is further adapted to cooperate with the POST routine as the POST routine is executed to identify and initiate code modules for execution.

In another aspect of the invention a method for adding a plug-in module to a BIOS program is provided, comprising steps of: (a) scanning a candidate plug-in module by a driver program provided as a part of the BIOS program; and (b) adding the plug-in module if and only if the scan determines the plug-in module is compatible with the BIOS program. In some embodiment a further step for accepting, a delete command for a plug-in module by the driver program, and executing the command by deleting the plug-in module is also provided. The BIOS program may be stored in a non-volatile storage device, and further comprising a step for transferring a physical copy of the content of the non-volatile storage device to Random Access Memory (RAM) before the step for scanning, and a step for reprogramming the non-volatile storage device with a copy of the BIOS program including the added plug-in. The non-volatile storage device may be a flash-ROM chip. In some embodiments as well, the BIOS program is stored in a non-volatile storage device, and a further step for transferring a physical copy of at least a reprogrammable portion of the non-volatile storage device to random-access memory (RAM) before the step for scanning is provided, and a step for reprogramming the reprogrammable portion including a copy of the added plug-in is also provided. The storage device may be a flash-ROM chip.

In yet another aspect a method for editing a BIOS plug-in program is provided, comprising steps of (a) providing an executable managing driver module in the BIOS program; (b) submitting proposed edits to the driver module; and (c) accomplishing the proposed edits if and only if the driver module determines the edits are compatible with the BIOS program. The editing includes operations for adding and deleting plug-in modules. In some instances the BIOS program is resident on a non-volatile storage device, and edits are accomplished by making a physical copy of the non-volatile storage device in RAM, including the code stored in the storage device, editing the copy in RAM, erasing at least the portion of the storage device where the edited code will reside, and copying the edited RAM copy back to the storage device.

In still another aspect of the invention, a Basic Input-Output System (BIOS) cooperative software suite is provided, comprising a BIOS layer comprising BIOS function code; a driver module adapted to perform editing and management functions with the BIOS layer; and an application layer adapted to create plug-in modules compatible with the BIOS layer and the driver module. The driver module is adapted to scan candidate plug-in modules to be added to the BIOS layer, to determine if the modules are compatible, to check for space available to add, and to the plug-in candidate modules only if space is available and the modules are determined to be compatible. In this embodiment as well, BIOS layer may be stored on a non-volatile storage device, including the driver module, and plug-in modules are added by creating a physical copy of the non-volatile storage device in random access memory (RAM), adding the candidate module in the physical copy, erasing the non-volatile storage device, and copying the changed physical copy back to the non-volatile storage device. The non-volatile storage device may be a flash-ROM chip. Management functions of the driver module include identifying and initializing plug-in modules for execution.

In embodiments of the present invention a system is provided for the first time incorporating a managing kernel on a ROM device, wherein the managing kernel is adapted and enabled to control editing of information stored in the ROM, and to perform other functions, such as housekeeping functions, allowing third patties to interact with the ROM and provide new capabilities, without having to know intimate details of the ROM storage device and data and programs stored thereon. Apparatus according to the invention and methods for practicing the invention are described in enabling detail below.

BRIEF DESCRIPTION OF THE DRAWING FIGURES

FIG. 4 is a table illustrating the structure of a third party software installation check for a VROM BIOS according to an embodiment of the present invention.

FIG. 5 is a field definition table for the fields represented in FIG. 4.

FIG. 6 is a table illustrating third party software functions according to an embodiment of the present invention.

FIG. 7 is a table illustrating VROM List structure and an accompanying definitions table according to an embodiment of the present invention.

DESCRIPTION OF THE PREFERRED EMBODIMENTS

Figure 1:
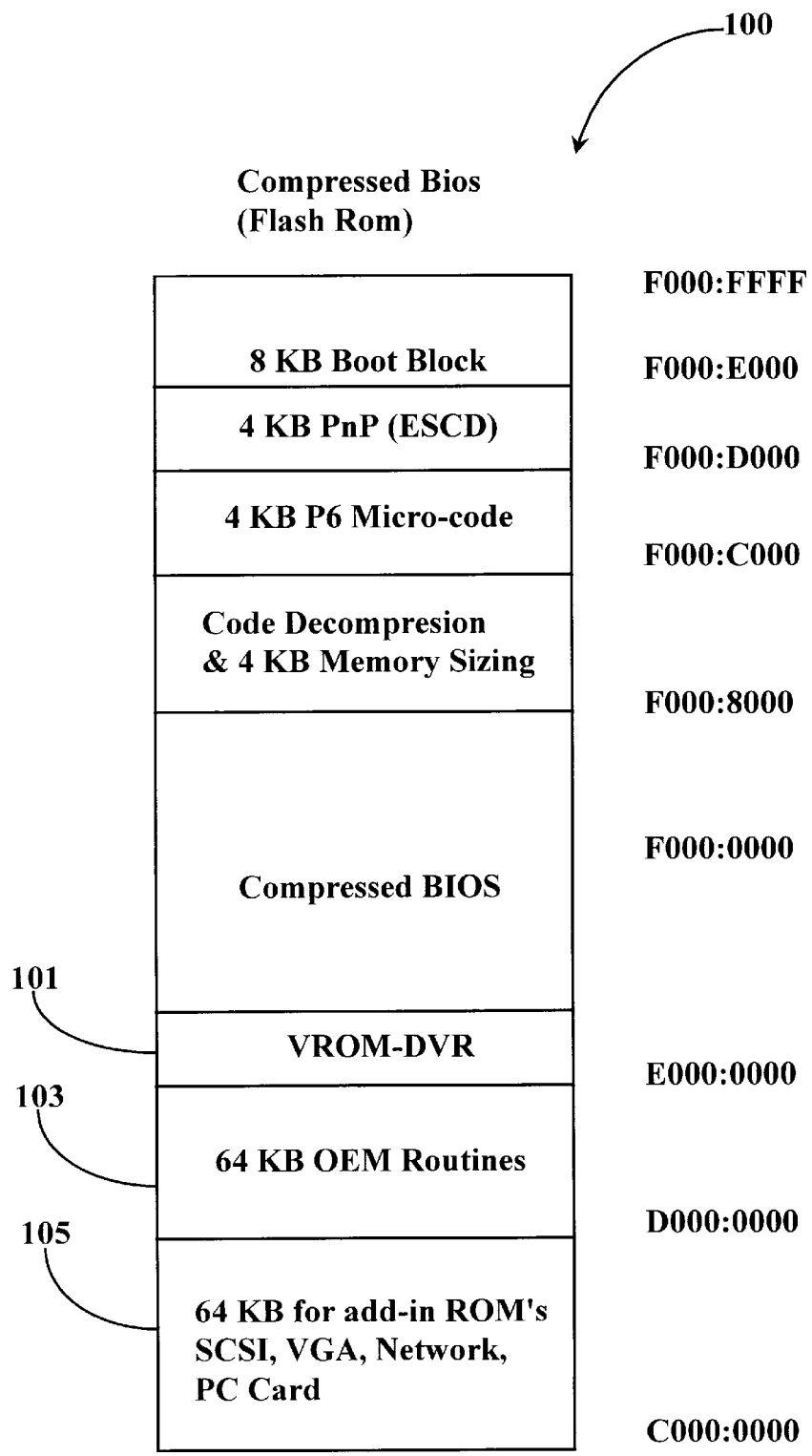
FIG. 1 is an enhanced BIOS memory map of a compressed BIOS in a 2 Mb Flash ROM according to an embodiment of the present invention.

In a preferred embodiment of the present invention a system BIOS is provided in flash ROM together with a unique driver associated with the BIOS as a mechanism for prioritizing, enabling, disabling, adding, and deleting plug-ins. The BIOS of the invention is not limited to Flash ROM, but could be applied to other types of reprogrammable non-volatile memory. Flash ROM is considered by the inventor to be a good choice for illustrating the several aspects of the invention, because some BIOS products in a preferred embodiment of the invention will be provided in Flash ROM.

In this specification the BIOS is named a Virtual ROM BIOS (VROM BIOS) and the unique driver which is part of the BIOS is termed the VROM-DVR. Given a flash-chip-resident VROM BIOS produced by a BIOS manufacturer according to an embodiment of the present invention, having an instance of the VROM-DVR, a cooperating third party, such as an OEM, may develop and install plug-ins in the Flash ROM adapted for a wide variety of purposes. In one aspect and embodiment of the invention plug-ins may be prepared and provided to OEMs by the BIOS manufacturer, and an OEM may then install the appropriate mix of plug-ins for a known or expected system architecture.

In another aspect of the invention third parties may be licensed or otherwise authorized to use a VROM development application provided by the BIOS manufacturer to develop and provide to the marketplace new VROM plug-ins. In some aspects end users may be able to also purchase and install plug-ins, such as by downloading from the Internet, for example.

In a preferred embodiment of the present invention the process of preparing and installing VROM-compatible plug-ins in a VROM BIOS works generally as follows: First a developer, using a VROM development application, prepares a plug-in incorporating the functional code to be installed. The functional code is accompanied by installation code compatible with the VROM-DVR of the VROM BIOS. In a system to which this plug-in is to be installed, the VROM BIOS is copied to RAM. This is a physical copy of the ROM chip arrangement of code, not the shadowing that takes place when a BIOS is initiated. The installation code accompanying the plug-in calls the VROM-DVR, which manages the addition of the function code of the new plug-in to the VROM BIOS copy in RAM.

In the installation process the VROM-DVR performs several operations, including checking for adequate space in the BIOS map for installation. In some embodiments, of the space is not available, the user may be prompted for approval to delete one or more resident modules to create room for the new plug-in. In others access may simply be denied, with explanation. If there is adequate space, the VROM-DVR adds the functional code of the new plug-in to the VROM BIOS RAM map, and then calls a reflash sequence to flash-erase the existing code in the BIOS chip, and to then copy the new RAM map to the chip.

It is not necessary that the developer or installer have any detailed knowledge of the chip itself, or of the mapping of VROM BIOS code on the chip. The VROM-DVR is specific to these facts and manages the installation according to necessity.

The VROM-BIOS is also adapted to manage deletion of plug-ins from a VROM BIOS chip in a fashion similar to that described above for code additions. A compatible program can call the VROM-DVR an initiate deletion of one or more modules, after which the chip may be reflashed to a new form. Other functions of the VROM-DVR are described below.

In many embodiments of the invention the VROM-DVR as a part of the VROM BIOS has other functionality, such as prioritizing and enabling plug-ins. The VROM-DVR may, for example, cooperate with POST code to scan for plug-ins, and enable and initiate plug-ins found.

FIG. 1 is a VROM BIOS 100 memory map illustrated in a compressed state in a 2 Mb (512 KB) Flash ROM chip according to an embodiment of the present invention, wherein VROM BIOS 100 has been enhanced with a unique VROM-DVR 101. The 2 Mb ROM chip is not limiting to the invention, which is applicable to other sizes, but 2 Mb is considered an adequate choice for illustrating aspects of the invention.

As an analogy, VROM-DVR 101 may be thought of in some respects as acting something like a mini-operating system that would read and write to a hard drive on a computer, except that in this case it is adapted to read from and write to the flash memory in BIOS 100. This unique and innovative approach allows a third party, such as an OEM, to add or remove components to and from BIOS 100 without intimate knowledge of the architecture and code content and residence of BIOS 100.

Figure 2:
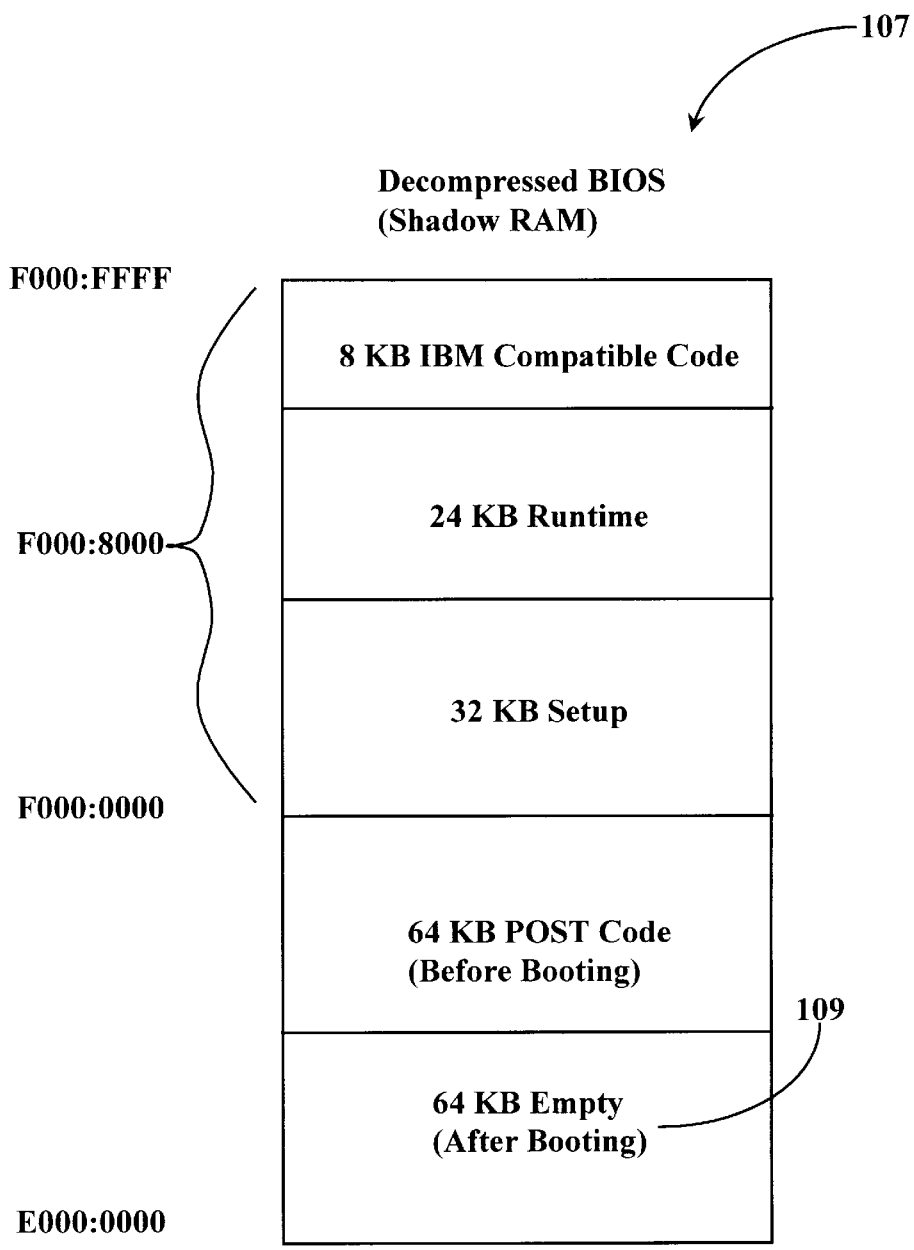
FIG. 2 illustrates the BIOS code map of FIG. 1 decompressed and shadowed to RAM in an embodiment of the present invention.

As described above, in a typical system ROM BIOS code is shadowed to RAM at startup. Since the code in the BIOS chip is compressed, decompression is typically accomplished as the code is passed to RAM. FIG. 2 is a RAM map of BIOS code after decompression and transfer to RAM. The amount of memory for BIOS and associated code in RAM is, of course, an issue, as memory is a precious resource in any system. The first set of operations to be performed by the BIOS code is the Power On Self Test (POST), and, after its use, this part of the code need not be retained in RAM, because it is not utilized during normal operations after POST, and will not be needed again until the system is powered down and restarted.

Referring to FIG. 1 and FIG. 2, memory addresses of data blocks in this embodiment are shown to the right of each block, and will be familiar to those skilled in the art. VROM-DVR 101 written into BIOS 100 during manufacturing provides a mechanism and method for prioritizing, enabling, disabling, adding, and deleting plug-ins without requiring intimate knowledge of chip architecture or code residence. The VROM-DVR is a code sequence that may be accessed by a CPU and executed, and is specific to a VROM-BIOS and its Flash ROM, having structure and/or access to stored data specific to the VROM BIOS version and the specific chip upon which the VROM BIOS is stored, in this example a 2 Mb Flash ROM.

Referring to FIG. 1, in addition to an 8 KB Boot Block, there is a 4 KB plug and play (PnP) utility, written in as extended system configuration data (ESCD), 4 KB of 16 Micro-code (known in the art), a 4 KB code decompression and memory sizing sector, and a compressed BIOS sector comprising the compressed BIOS function code. Section 103 is a 64 KB section reserved for plug-ins provided by an OEM, and section 105 is a 64 KB section reserved for add-in routines such as a Video Graphics Array (VGA) adapter, a small computer systems interface (SCSI) driver network and PC card plug-ins, and the like.

FIG. 2 is an exemplary BIOS memory map of the BIOS code of FIG. 1 shadowed to RAM according to an embodiment of the present invention. In this instance, runtime routines, IBM compatible code, and system set up routines are shown. Address location in RAM is illustrated to the left of FIG. 2 as is known in the art. 64 KB of power on self test (POST) code is shown in the shadowed RAM, and this same sector is shown again as empty after booting as element 109. This POST code is no longer needed after boot.

In the VROM BIOS the POST code is adapted to recognize added plug-ins and BIOS extensions, to relocate such plug-ins and extensions out of Flash ROM into shadow RAM, and to look for a signature and activate each such module by executing the module's INIT routine.

Table 111 in FIG. 2 represents locations in RAM where add-in device modules in section 105 of FIG. 1 are shadowed in this exemplary embodiment. The amount of add-in data or plug-in modules that may be employed is only limited by the amount of available unused flash-memory.

Figure 3:
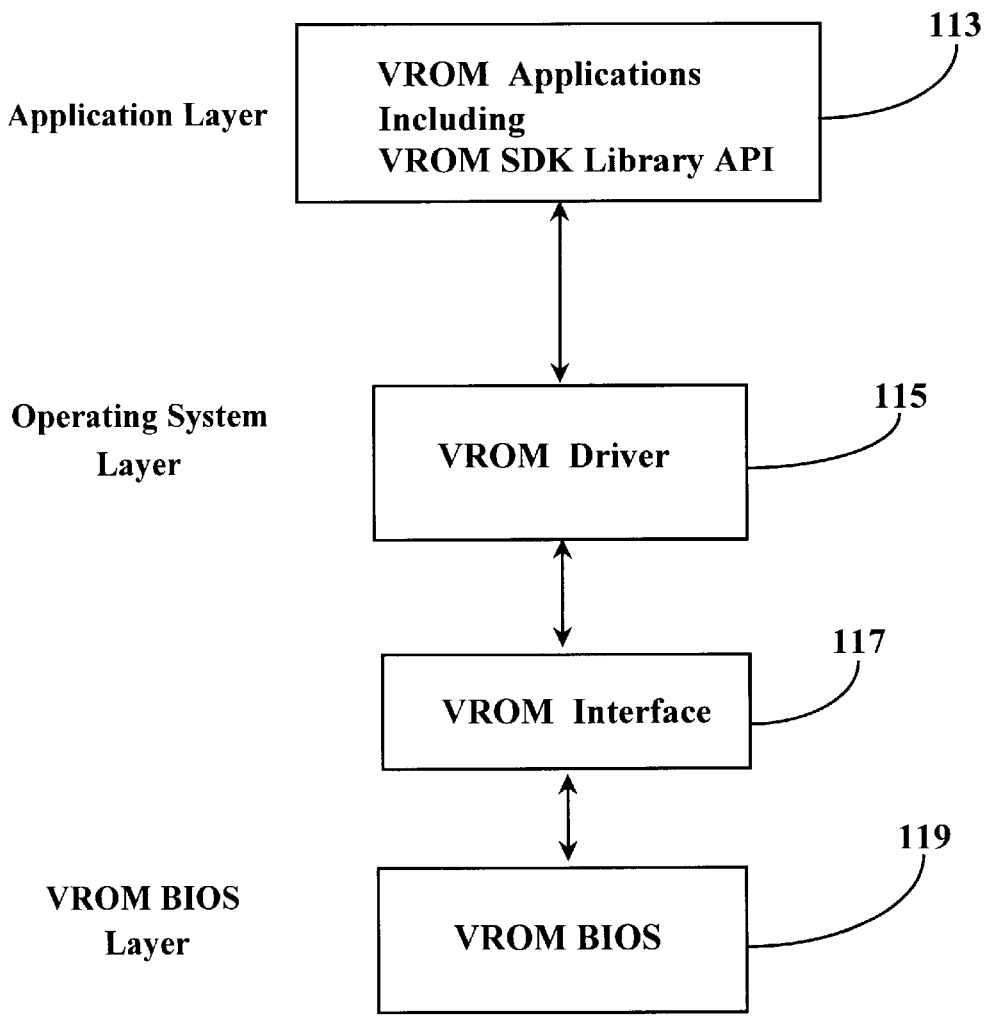
FIG. 3 is a block diagram illustrating the software architecture of a VROM system according to an embodiment of the present invention.

FIG. 3 is a block diagram illustrating software architecture of a VROM BIOS system according to an embodiment of the present invention. An application layer 113 represents a user interface adapted to enable a third party to prepare plug-ins to be added to a VROM BIOS having a VROM-DVR according to the invention, and includes in this example a software development kit (SDK) and application program interface (API) library. Examples of add-in programs may include but are not limited to virus protection programs, disk utility programs, network card scanning programs, and so on.

VROM driver 115 is the driver on the Flash ROM chip in this example (VROM-DVR) and is adapted to access each VROM area on BIOS 100 of FIG. 1. VROM-DVR 115 is specific to a Flash ROM (or other non-volatile storage device) upon which it resides, to the VROM-BIOS integrated in the ROM, and also to the Operating System (OS) of a computer upon to which the VROM-BIOS will be applicable. VROM BIOS 119 is the code set on BIOS 100 providing BIOS functionality.

FIG. 4 is a table illustrating the structure of an Installation Check that allows application software to determine if a system has in fact a VROM BIOS according to an embodiment of the present invention. The Installation Check includes a searching method for a signature of the ASCII string "VROMBIOS" in system memory starting from 0F0000h to 0FFFFFh at every 16-byte boundary. The software can then determine if the structure is valid by calculating the checksum. The method to perform the checksum operation is to add up the length bytes from the top of the structure into an 8-bit value. A sum of zero indicates a valid structure. The entry points in this structure are the software interface to the VROM BIOS functions.

FIG. 5 is a field definition table for the various fields listed in FIG. 4. Beginning at the top of FIG. 5, the field Signature is represented as an American Standard Code for Information Exchange (ASCII) string which is a common method for representing text with symbols. For example the character string "VROMBIOS" could be used. The version field is a BCD value that is represented as in the following example (value of 10h=version 1.0) etc. Length field is the total bytes of the whole installation structure starting from the signature. Checksum field is a simple error detection scheme that is known in the art. Checksum adds up the bytes in an installation structure and a receiving station then compares values to verify a valid structure. Real Mode Interface is the segment offset to the entry point. Real mode is the mode in which DOS executes it's programs. 32-bit protected mode interface is a code segment base address. With protected mode memory space is protected from overlapping into another memory space assigned to a different program. The Windows™ operating system uses protected mode.

By incorporating both Real Mode and Protected Mode, add-in programs may be installed from DOS and from Windows™. It will be apparent to one with skill in the art that there are variations possible with respect to the tables presented in FIGS. 4 and 5 without departing from the spirit and scope of the present invention. For example, in one embodiment, installation could be performed using a different platform such as O/S 2 or UNIX. In a preferred embodiment a Windows™ environment is utilized.

FIG. 6 is a table illustrating third party software function according to an embodiment of the present invention wherein listed functions are options to a third party such as a system integrator or a PC user. From top down, Function-0 Get VROM Lists returns VROM lists residing in flash VROM into a List Buffer where they can be analyzed. List Buffer as termed by the inventor must be large enough to hold all of the VROM lists. The next function is Function-1 Get VROM Size which returns the VROM size in bytes to the calling software. Function-2 Enable/Disable VROM List allows the caller to enable or disable the VROM List in the VROM lists. The VROM buffer as termed by the inventor must be large enough to store all of the VROM data. Function-3 Read in VROM Data allows a third party calling software to read in VROM data from VROM list area. Function-4 Add/Delete VROM Data allows third party calling software to add or delete VROM data.

It will be apparent to one with skill in the art that a third party calling software may be utilized by a software vendor that is licensed to provide the BIOS add-in program, a licensed system integrator, or by a user that has purchased a BIOS add-in program. Termed "VROM plug-ins" by the inventor, these add-in programs will typically be licensed products and can be either pre-boot functions or post-boot, BIOS-enabled functions.

FIG. 7 is a table illustrating a VROM List structure and an accompanying definition table according to an embodiment of the present invention. The inventor fully expects the list structure and accompanying definitions to be self-explanatory to those with skill in the art.

The VROM List tells the calling software application important information regarding where data is stored, how large each data block is, the type of data such as VGA, and so on. This data will change to reflect current status after an installation and /or deletion of a program. A mechanism (not shown) is also provided to offer a set of instructions in the event of a return error indicating a problem with the install. In one embodiment, a protection mechanism may restore previous settings by using a mirroring technique (known in the art) so that a backup or default installation may take priority.

It will be apparent to one with skill in the art that there are a variety of alterations that might be made in the embodiments of the invention described herein without departing from the spirit and scope of the present invention. Some of these variations have already been discussed, such as the use of other non-volatile storage devices other than Flash ROM, and differing sized of storage devices that may be used other than the 2 Mb ROM described in embodiments herein. There are many other such variations. It is well-known, for example, that programmers have individualistic ways to structure code, and many variable code structures may accomplish similar ends. Similarly there are many sorts of plug-ins that may be accomplished to a VROM BIOS according to an embodiment of the present invention. Some may accomplish pre-boot functions, and others may accomplish post-boot BIOS-enabled functions. Among the many possibilities are disk utility programs, virus protection programs, PC card scanning programs, specific device BIOS code, and the like. The spirit and scope of the present invention is limited only by the claims that follow.

What is claimed is:

1. A Basic Input Output System (BIOS) program, comprising:

BIOS function code modules; and a BIOS editing management driver code module;

wherein the BIOS editing management driver code module is adapted to scan a candidate code module presented for addition to the BIOS program, to validate the candidate module as compatible and authorized to be added, to scan the BIOS program for space available to add the candidate module, and to add the candidate module if validated and space is available.

2. The BIOS program of claim 1 wherein the BIOS program includes a Power On Self Test (POST) routine, and the BIOS editing management driver code module is further adapted to cooperate with the POST routine as the POST routine is executed to identify and initiate code modules for execution.

3. A Basic Input Output System (BIOS) comprising:
  a non-volatile storage device;
  a BIOS program residing on the non-volatile storage device and occupying a first number of bytes in a first storage region; and
  a BIOS editing management driver code module residing on the non-volatile storage device and occupying a second number of bytes in a second storage region, wherein the first number of bytes and the second number of bytes together are less than the maximum byte capacity by a third number of bytes defining a third storage region for storing plug-in modules;
  wherein the BIOS editing management driver code module has access to specifics of all resident code and characteristics of the storage device, and is adapted, upon execution, to add plug-in modules and to and remove plug-in modules from the storage device in the third storage region.

4. The BIOS of claim 3 wherein addition of a plug-in module is managed by transferring a physical copy of the BIOS program, the BIOS editing management driver code module, and any existing plug-in modules in the third storage region to random-access memory (RAM), scanning any candidate plug-in module for validity and compatibility, confirming space available for adding the candidate, adding the candidate to the physical map in the third storage region if space is available and the candidate is valid, creating thereby a new physical map, erasing the non-volatile storage device, and copying the new physical map to the non-volatile storage device.

5. The BIOS of claim 3 wherein the non-volatile storage device is a flash ROM, and erasing involves flash-erasing the ROM.

6. The BIOS of claim 5 wherein the flash-ROM has an overall capacity of at least two mega-bits (Mb).

7. The BIOS of claim 3 wherein addition of a plug-in module is managed by transferring a physical copy of at least the third storage region to random-access memory (RAM), scanning any candidate plug-in module for validity and compatibility, confirming space available in the third storage region for adding the candidate module, adding the candidate module to the physical map in the third storage region if space is available and the candidate module is valid, creating thereby a new physical map, erasing the portion of the non-volatile storage device transferred to RAM, and copying the new physical map to the non-volatile storage device.

8. The BIOS of claim 3 wherein the BIOS program includes a Power On Self Test (POST) routine, and the BIOS editing management driver code module is further adapted to cooperate with the POST routine as the POST routine is executed to identify and initiate code modules for execution.

9. A method for adding a plug-in module to a BIOS program, comprising step of:

(a) scanning a candidate plug-in module by a BIOS editing management driver program provided as a part of the BIOS program; and
  (b) adding the plug-in module if and only if the scan determines the plug-in module is compatible with the BIOS program.

10. The method of claim 9, further comprising a step for accepting a delete command for a plug-in module by the BIOS editing management driver program, and executing the command by deleting the plug-in module.

11. The method of claim 9 wherein the BIOS program is stored in a non-volatile storage device, and further comprising a step for transferring a physical copy of the content of the non-volatile storage device to Random Access Memory (RAM) before the step for scanning, and a step for reprogramming the non-volatile storage device with a copy of the BIOS program including the added plug-in.

12. The method of claim 11 wherein the non-volatile storage device is a flash-ROM chip.

13. The method of claim 9 wherein the BIOS is stored in a non-volatile storage device, and further comprising a step for transferring a physical copy of at least a re-programmable portion of the non-volatile storage device to random-access memory (RAM) before the step for scanning, and a step for reprogramming the re-programmable portion including a copy of the added plug-in.

14. The method of claim 13 wherein the non-volatile storage device is a flash-ROM chip.

15. A method for editing a BIOS program, comprising steps of:
  (a) providing an executable BIOS editing management driver module in the BIOS program;
  (b) submitting proposed edits to the driver module; and
  (c) accomplishing the proposed edits if and only if the driver module determines the edits are compatible with the BIOS program.

16. The method of claim 15 wherein proposed edits comprise adding and deleting plug-in modules.

17. The method of claim 15 wherein the BIOS program is resident on a non-volatile storage device, and edits are accomplished by making a physical copy of the non-volatile storage device in RAM, including the code stored in the storage device, editing the copy in RAM, erasing at least the portion of the storage device where the edited code will reside, and copying the edited RAM copy back to the storage device.

18. A Basic Input-Output System (BIOS) cooperative software suite, comprising:
  a BIOS layer comprising BIOS function code;
  a BIOS editing management driver module adapted to perform editing and management functions with the BIOS layer; and
  an application layer adapted to create plug-in modules compatible with the BIOS layer and the driver module;
  wherein the driver module is adapted to scan candidate plug-in modules to be added to the BIOS layer, to determine if the modules are compatible, to check for space available to add, and to the plug-in candidate modules only if space is available and the modules are determined to be compatible.

19. The software suite of claim 18 wherein the BIOS layer is stored on a non-volatile storage device, including the BIOS editing management driver module, and plug-in modules are added by creating a physical copy of the non-volatile storage device in random access memory (RAM), adding the candidate module in the physical copy, erasing the non-volatile storage device, and copying the changed physical copy back to the non-volatile storage device.

20. The software suite of claim 19 wherein the non-volatile storage device is a flash-ROM chip.

21. The software suite of claim 18 wherein management functions of the BIOS editing management driver module include identifying and initializing plug-in modules for execution.

* * * * *